United States Patent
Ueno

(10) Patent No.: US 10,067,339 B2
(45) Date of Patent: Sep. 4, 2018

(54) OPTICAL SCANNER, OPTICAL SCANNING METHOD AND NON-TRANSIENT RECORDING MEDIUM

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Sueo Ueno, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 232 days.

(21) Appl. No.: 14/810,675

(22) Filed: Jul. 28, 2015

(65) Prior Publication Data

US 2017/0031154 A1 Feb. 2, 2017

(51) Int. Cl.
G02B 26/10 (2006.01)
G03G 15/04 (2006.01)
G02B 26/08 (2006.01)
G03G 15/043 (2006.01)

(52) U.S. Cl.
CPC ....... *G02B 26/105* (2013.01); *G02B 26/0833* (2013.01); *G03G 15/043* (2013.01); *G03G 15/04036* (2013.01)

(58) Field of Classification Search
CPC .............. G02B 26/0833; G02B 26/105; G02B 26/0841; G02B 26/085; G02B 26/10; G02B 27/0031; G02B 6/3518; G02B 6/3572; G02B 6/3584; G02B 26/0858; G02B 26/101; G02B 6/357; H04N 1/113; H04N 1/1135; H04N 2201/0471; H04N 2201/04744; H04N 2201/04755; H04N 9/3129

See application file for complete search history.

(56) References Cited

U.S. PATENT DOCUMENTS

| | | | | |
|---|---|---|---|---|
| 6,275,326 B1* | 8/2001 | Bhalla | ............... | G02B 26/0841 359/224.1 |
| 6,311,894 B1* | 11/2001 | Miyajima | ............ | G02B 26/105 235/462.36 |
| 8,810,623 B2 | 8/2014 | Mizutani | | |
| 2006/0049826 A1* | 3/2006 | Daneman | ............. | G02B 6/3518 324/207.13 |
| 2009/0225383 A1* | 9/2009 | Soeda | ...................... | B41J 2/473 359/198.1 |
| 2014/0333980 A1* | 11/2014 | Hofmann | ........... | G02B 26/0833 359/221.2 |
| 2015/0062943 A1* | 3/2015 | Takahira | ............... | B60Q 1/0023 362/510 |
| 2016/0007108 A1* | 1/2016 | Lee | .......................... | H04R 1/08 381/111 |

* cited by examiner

*Primary Examiner* — Bumsuk Won
*Assistant Examiner* — Balram Parbadia
(74) *Attorney, Agent, or Firm* — Amin, Turocy & Watson LLP

(57) ABSTRACT

An optical scanner comprises a light source, an MEMS mirror and a position detector. The light source emits a light beam. The MEMS mirror deflects the light beam emitted from the light source. The position detector detects the position of the MEMS mirror. The position detector is configured on the same semiconductor substrate with the MEMS mirror.

2 Claims, 8 Drawing Sheets

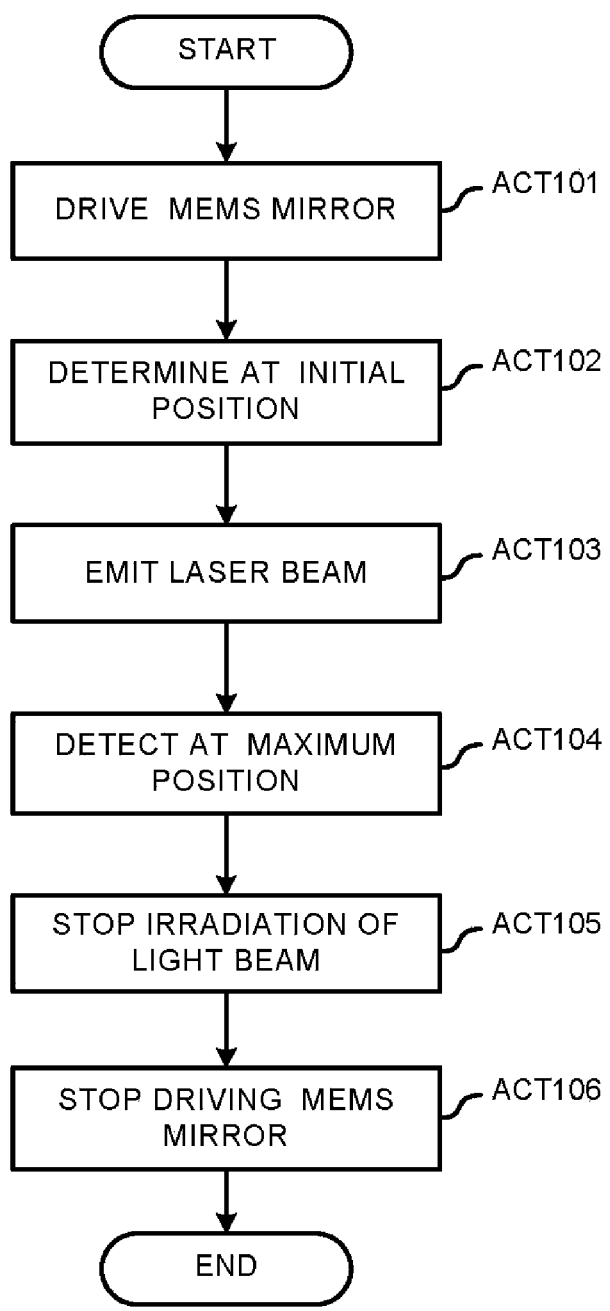

OPTICAL SCANNER, OPTICAL SCANNING METHOD AND NON-TRANSIENT RECORDING MEDIUM

FIELD

Embodiments described herein relate to an optical scanner, an optical scanning method and a non-transient recording medium.

BACKGROUND

The optical scanner used in an image forming apparatus for forming an electrostatic latent image on a photoconductive drum uses a Micro Electro Mechanical System (MEMS) mirror. The optical scanner drives the MEMS mirror so that a photoconductive drum is scanned by laser to form an electrostatic latent image. Sometimes, the drive position of the MEMS mirror is deviated for the change in temperature or the secular change of the MEMS mirror. Thus, the optical scanner needs to detect the drive position of the HEMS mirror. However, sometimes, to detect the drive position of the MEMS mirror, another optical sensor such as a light beam detection sensor must be provided for laser detection, thus increasing the size of the optical scanner.

DESCRIPTION OF THE DRAWINGS

FIG. 3 is a diagram illustrating the scan control action of an optical scanner 1 according to embodiment 1;

DETAILED DESCRIPTION

In accordance with an embodiment, an optical scanner comprises a light source, an MEMS mirror and a position detector. The light source emits a light beam. The MEMS mirror deflects the light beam emitted from the light source. The position detector detects the position of the MEMS mirror. The position detector is configured on the same semiconductor substrate with the MEMS mirror.

Embodiment 1

Figure 1:
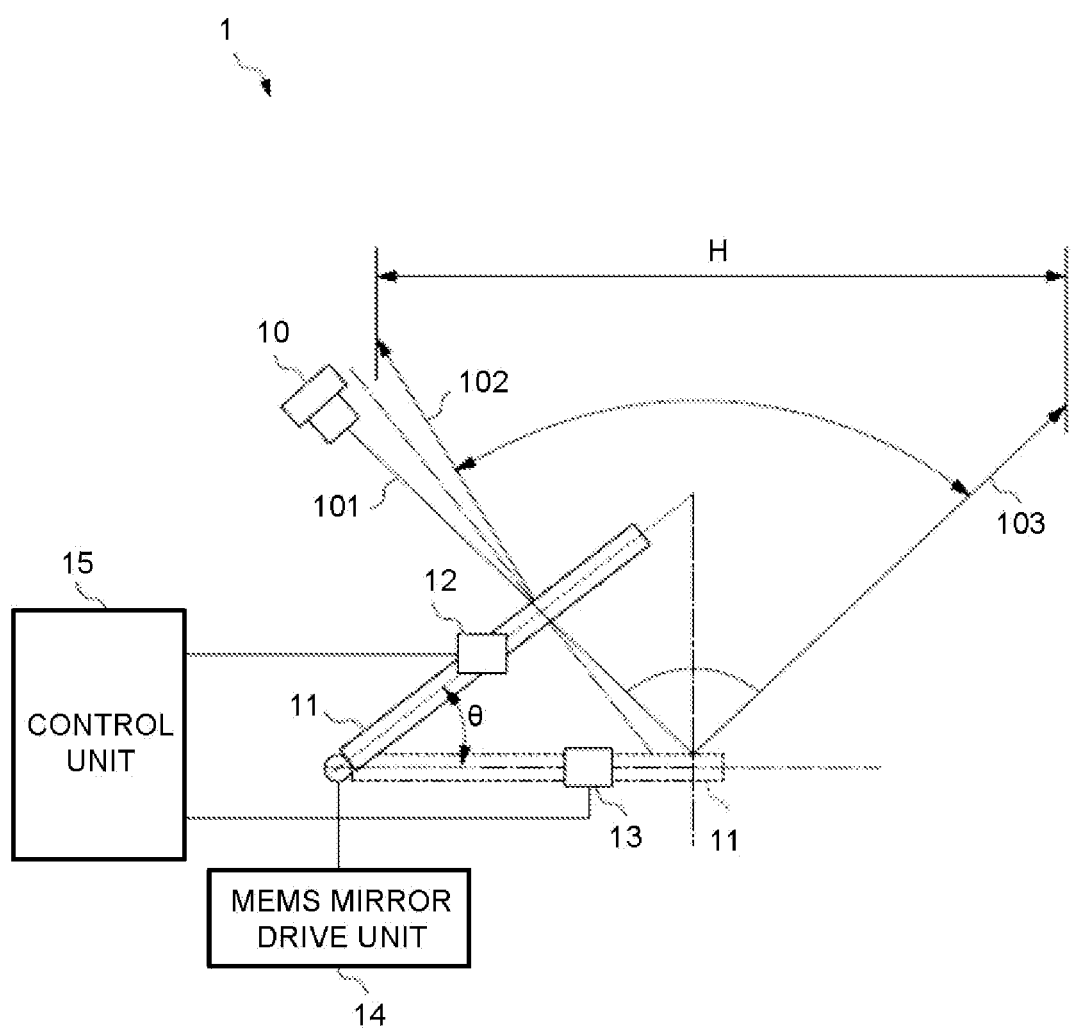
FIG. 1 is a diagram illustrating the appearance of an example of an optical scanner 1 according to embodiment 1.

FIG. 1 is a diagram illustrating the appearance of an example of an optical scanner 1 according to an embodiment. For example, the optical scanner 1 is applied to an image forming apparatus which is, for example, a Multi-Function Peripheral (MFP). The optical scanner 1 emits a light beam which is modulated according to an image signal read by the image forming apparatus. Moreover, the optical scanner 1 reflects the light beam with the MEMS mirror and irradiates (exposes) the surface of a photoconductive drum with the reflected light beam to form an electrostatic latent image. In this case, the optical scanner 1 detects the drive position of the MEMS mirror using the position detector configured on the same semiconductor substrate with the MEMS mirror.

The optical scanner 1 comprises a light source 10, an MEMS mirror 11, position detectors 12 and 13, an MEMS mirror drive unit 14 and a control unit 15.

The light source 10 is a light-emitting component which emits light beam 101. For example, the light source 10 is a laser diode.

The MEMS mirror 11 is configured on the outgoing direction of the light beam. The position of the MEMS mirror 11 indicated by the solid lines shown in FIG. 1 represents the initial position of the MEMS mirror 11. The initial position is the position where the MEMS mirror 11 is configured when the optical scanner 1 starts an exposure operation. When an exposure operation is started, the light beam 101 emitted from the light source 10 is reflected by the MEMS mirror 11 at the initial position. The reflected light beam 102 irradiates the position where the optical scanner 1 starts a primary scan, that is, the position where the scan on the photoconductive drum is started, thereby starting an exposure operation.

In the MEMS mirror 11, the position of the MEMS mirror 11 indicated by the dashed lines shown in FIG. 1 represents the maximum position of the MEMS mirror 11. The maximum position refers to the position where the MEMS mirror 11 is located after the optical scanner 1 completes an exposure operation. The light beam 101 emitted from the light source 10 is reflected by the MEMS mirror 11 at the maximum position when an exposure operation is ended. The reflected light beam 103 irradiates the position where the optical scanner 1 completes a primary can, that is, the position where the scan on the photoconductive drum is ended, thereby ending an exposure operation. Thus, the working range of the MEMS mirror is from the initial position to the maximum position. That is, the working angle of the MEMS mirror is an angle θ.

The position detector 12 is configured at the initial position of the MEMS mirror 11. The position detector 12 is configured on the same semiconductor substrate with the MEMS mirror 11. The position detector 12 detects whether or not the MEMS mirror 11 is at the initial position. The position detector 12 comprises a light-emitting component 12-1 and a light-receiving component 12-2. When the MEMS mirror 11 is at the initial position, the position detector 12 reflects the light emitted from the light-emitting component 12-1 with the wall surface of the MEMS mirror 11. Moreover, the light reflected by the wall surface of the MEMS mirror 11 is received by the light-receiving component 12-2. Then, the position detector 12 detects that the MEMS mirror 11 is at the initial position when the light is received by the light-receiving component 12-2. When receiving the light reflected by the wall surface of the MEMS mirror 11, the light-receiving component 12-2 outputs a light receiving signal to the control unit 15 as a position signal.

The position detector 13 is configured at the maximum position of the MEMS mirror 11. The position detector 13 is configured on the same semiconductor substrate with the MEMS mirror 11. The position detector 13 detects whether or not the MEMS mirror 11 is at the maximum position. The position detector 13 comprises a light-emitting component 13-1 and a light-receiving component 13-2. When the MEMS mirror 11 is at the maximum position, the position detector 13 reflects the light emitted from the light-emitting component 13-1 with the wall surface of the MEMS mirror 11. Moreover, the light reflected by the wall surface of the MEMS mirror 11 is received by the light-receiving component 13-2. Then, the position detector 13 detects that the MEMS mirror 11 is at the maximum position when the light is received by the light-receiving component 13-2. When receiving the light reflected by the wall surface of the MEMS mirror 11, the light-receiving component 13-2 outputs a light receiving signal to the control unit 15 as a position signal.

The position where the optical scanner 1 carries out a primary scan is determined by the positions of the light source 10 and the MEMS mirror 11. In other words, the position of the MEMS mirror 11 is determined by the position where the optical scanner 1 carries out a primary scan and the position of the light source 10. Thus, the configuration position of the position detector 12 is determined by the start position of an area H in which the optical scanner 1 carries out a primary scan and the position of the light source 10. Then, the configuration position of the position detector 13 is determined by the end position of the area H in which the optical scanner 1 carries out the primary scan and the position of the light source 10.

Figure 2:
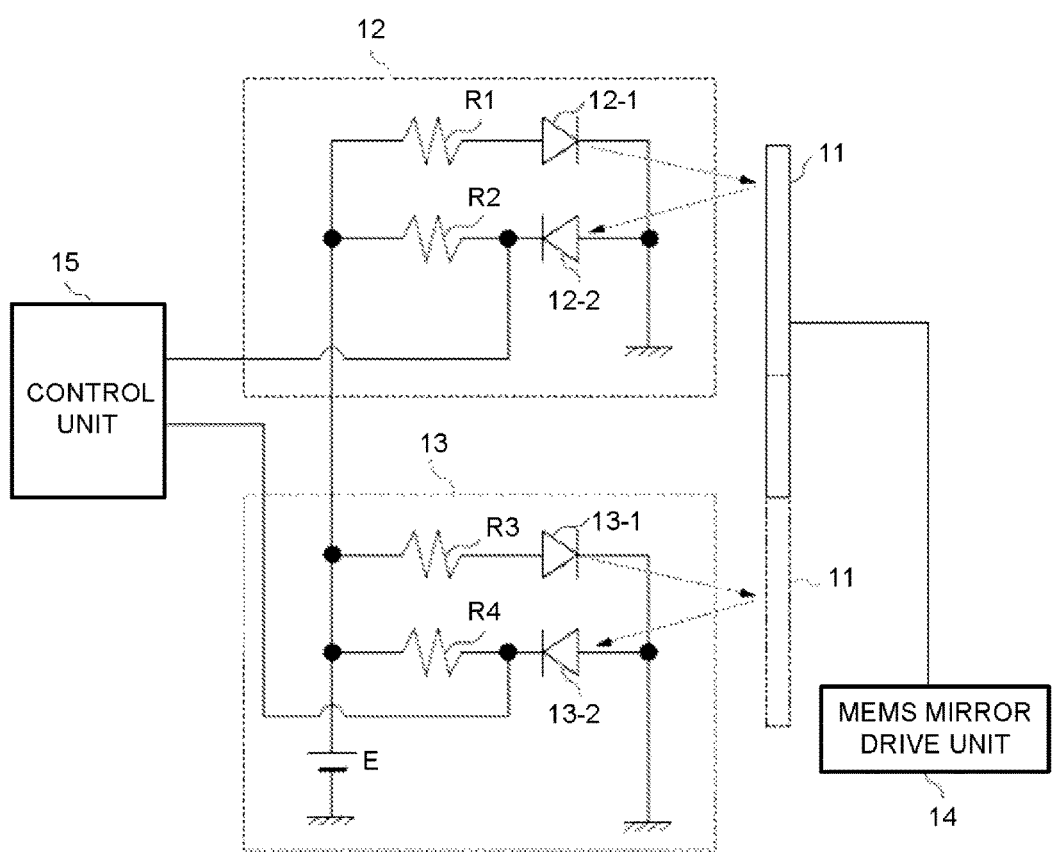
FIG. 2 is a diagram exemplifying the general structures of the position detectors 12 and 13 of an optical scanner 1 according to embodiment 1.

FIG. 2 is a diagram exemplifying the general structures of the position detectors 12 and 13 of the optical scanner 1 according to an embodiment.

The position detector 12 comprises a light-emitting component 12-1, a light-receiving component 12-2 and resistors R1 and R2. For example, the light-emitting component 12-1 is a Light Emitting Diode (LED) driven by a power supply E. For example, the light-receiving component 12-2 is a photo Diode (PD) driven by the power supply E.

The resistor R1 is a limiter resistor which limits the current supplied from the power supply E to the light-emitting component 12-1. Applied with a specific current, the light-emitting component 12-1 is generally luminous. The resistor R2 is a limiter resistor which limits the current flowing to the light-receiving component 12-2. When receiving the light reflected by the wall surface of the MEMS mirror 11 at the initial position, the light-receiving component 12-2 generates a voltage between the two terminals of the resistor R2. The generated voltage is output by the light-receiving component 12-2 to the control unit 15 as a position signal. That is, the light emitted from the light-emitting component 12-1 is reflected by the wall surface of the MEMS mirror 11 at the initial position. Moreover, the light-receiving component 12-2 receives the reflected light, performs photoelectric conversion on the received light to convert the light into a position signal and outputs the position signal to the control unit 15.

The position detector 13 comprises a light-emitting component 13-1, a light-receiving component 13-2 and resistors R3 and R4. For example, the light-emitting component 13-1 is an LED driven by the power supply E. For example, the light-receiving component 13-2 is a PD driven by the power supply E. The resistor R3 is a limiter resistor which limits the current supplied from the power supply E to the light-emitting component 13-1. Applied with a specific current, the light-emitting component 13-1 is generally luminous. The resistor R4 is a limiter resistor which limits the current flowing to the light-receiving component 13-2. When receiving the light reflected by the wall surface of the MEMS mirror 11 at the maximum position, the light-receiving component 13-2 generates a voltage between the two terminals of the resistor R4. The generated voltage is output by the light-receiving component 13-2 to the control unit 15 as a position signal. That is, the light emitted from the light-emitting component 13-1 is reflected by the wall surface of the MEMS mirror 11 at the maximum position. Moreover, the light-receiving component 13-2 receives the reflected light, performs photoelectric conversion on the light received to convert the light into a position signal and outputs the position signal to the control unit 15.

The MEMS mirror drive unit 14 drives the MEMS mirror 11 in the area H. The MEMS mirror drive unit 14 stops driving the MEMS mirror 11 according to a control signal sent from the control unit 15.

After acquiring the position signal sent from the light-receiving component 12-2, the control unit 15 determines that the MEMS mirror 11 is at the initial position. After acquiring the position signal sent from the light-receiving component 13-2, the control unit 15 determines that the MEMS mirror 11 is at the maximum position.

The control unit 15 controls the drive of the MEMS mirror drive unit 14 according to the position signal. The control unit 15 controls the timing of the irradiation of the light beam of the light source 10 according to the position signal. For example, after acquiring the position signal sent from the light-receiving component 12-2, the control unit 15 activates the light source 10 to emit a light beam, thereby starting an exposure operation from the position where the scan on the photoconductive drum is started. After acquiring the position signal sent from the light-receiving component 13-2, the control unit 15 outputs a control signal to the MEMS mirror drive unit 14 so that the MEMS mirror drive unit 14 stops driving the MEMS mirror 11. In this way, the control unit 15 stops the MEMS mirror 11 at the maximum position. That is, the control unit 15 controls the drive for the MEMS mirror 11 according to the detection result of the position detector 12 or 13. The control unit 15 controls the timing of the irradiation of the light beam of the light source 10 according to the detection result of the position detector 12 or 13.

Figure 4A:
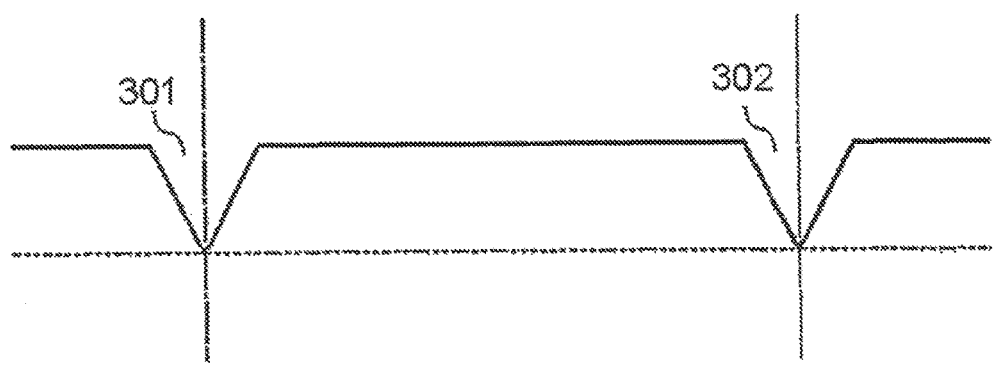
FIG. 4A is a timing chart illustrating the acquisition of a position signal by a control unit 15 according to embodiment 1.

The scan control of the optical scanner 1 of the embodiment is described below with reference to accompanying drawings. FIG. 3 is a flowchart illustrating a scan control action of the optical scanner 1 according to embodiment 1. FIG. 4A is a timing chart illustrating the acquisition of a position signal by the control unit 15 according to embodiment 1.

The MEMS mirror drive unit 14 drives the MEMS mirror 11 towards the direction of the initial position (Act 101).

The control unit 15 acquires a position signal 301 sent from the position detector 12 when the MEMS mirror 11 arrives at the initial position. After acquiring the position signal 301, the control unit 15 determines that the MEMS mirror 11 is at the initial position (Act 102).

After determining that the MEMS mirror 11 arrives at the initial position, the control unit 15 activates the light source 10 to emit a light beam. The light beam emitted from the light source 10 is reflected by the MEMS mirror 11 to the position where the scan on the photoconductive drum is started. In this way, the optical scanner 1 starts to expose the photoconductive drum (Act 103).

The MEMS mirror drive unit 14 drives the MEMS mirror 11 towards the direction of the maximum position. The control unit 15 acquires a position signal 302 sent from the position detector 13 when the MEMS mirror 11 arrives at the maximum position. After acquiring the position signal 302, the control unit 15 detects that the MEMS mirror 11 arrives at the maximum position (Act 104).

Further, the timing at which the MEMS mirror 11 arrives at the maximum position refers to the timing at which the light beam arrives at the position where the scan on the photoconductive drum is ended.

After determining that the MEMS mirror 11 arrives at the maximum position, the control unit 15 stops the irradiation of the light beam from the light source 10 (Act 105).

The control unit 15 outputs a control signal to the MEMS mirror drive unit 14. After acquiring the control signal, the MEMS mirror drive unit 14 stops driving the MEMS mirror 11.

Figure 4B:
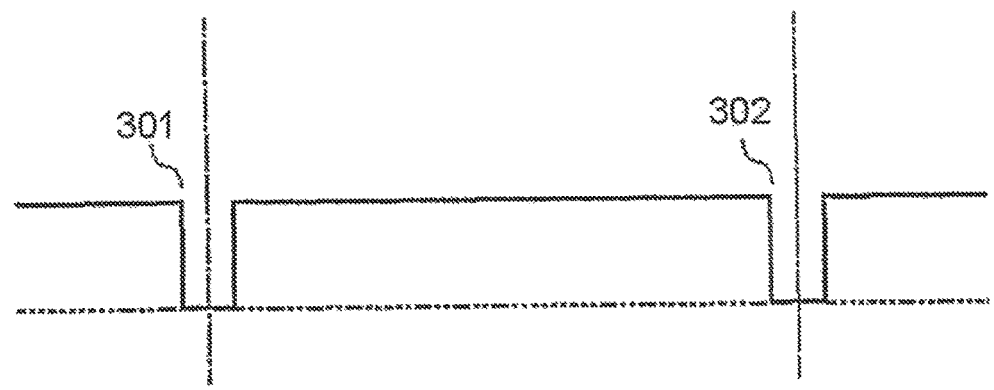
FIG. 4B is a diagram illustrating the binaryzation of a position signal acquired by a control unit 15 according to embodiment 1.

Further, as shown in FIG. 4B, the position signals 301 and 302 are binarized into control signals.

Embodiment 2

Figure 5:
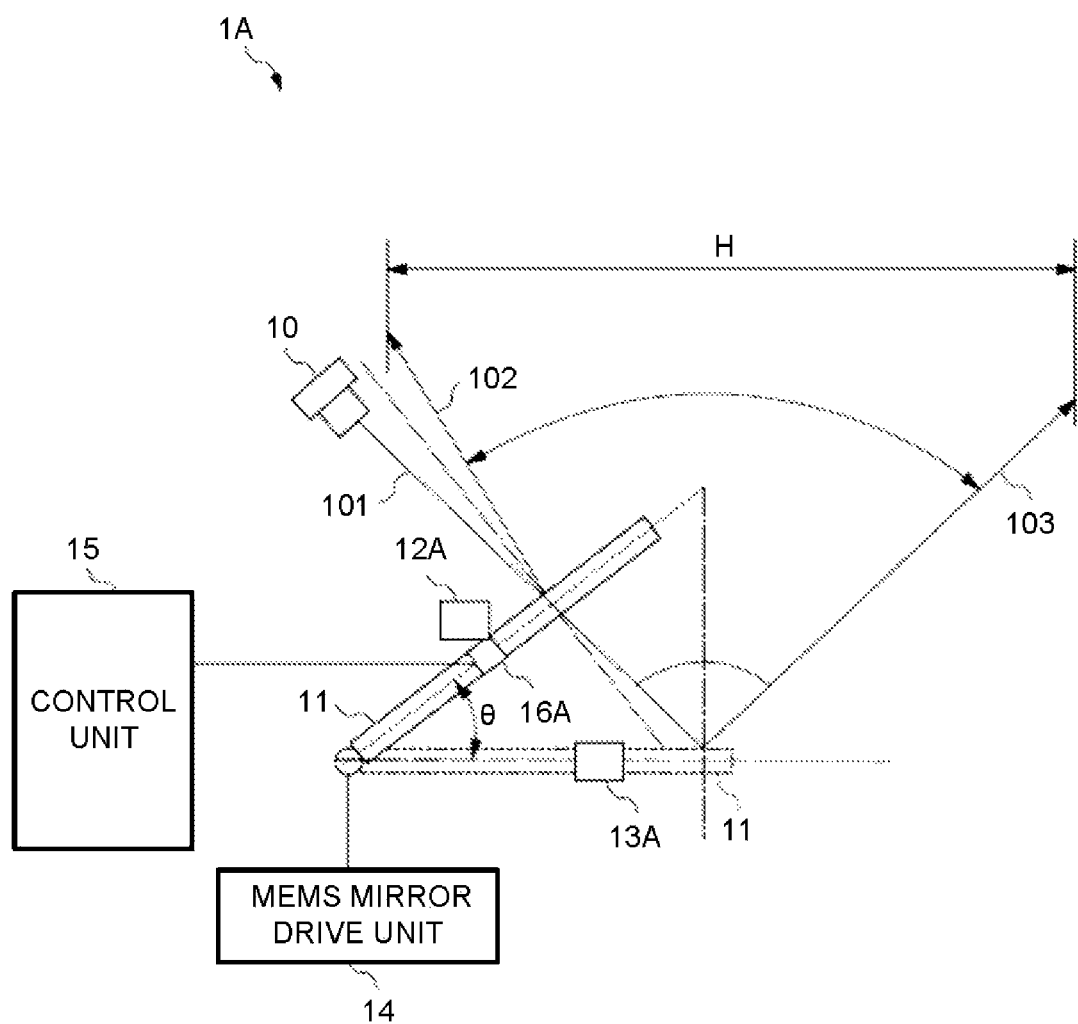
FIG. 5 is a diagram illustrating the appearance of an example of an optical scanner 1A according to embodiment 2.

FIG. 5 is a diagram illustrating the appearance of an example of an optical scanner 1A according to embodiment 2. For example, the optical scanner 1A is applied to an image forming apparatus. Moreover, the structural elements shown in FIG. 5 which are identical to those involved in embodiment 1 are denoted by the same reference signs and not described repeatedly here. The optical scanner 1A emits a light beam which is modulated according to an image signal read by the image forming apparatus. Moreover, the optical scanner 1A reflects the light beam with the MEMS mirror and irradiates (exposes) the surface of a photoconductive drum with the reflected light beam to form an electrostatic latent image. In this case, the optical scanner 1A detects the drive position of the MEMS mirror using a position detector configured on the same semiconductor substrate with the MEMS mirror.

The optical scanner 1A comprises a light source 10, an MEMS mirror 11, position detectors 12A and 13A, an MEMS mirror drive unit 14, a control unit 15 and a position detector 16A.

The position detector 12A is configured at the initial position of the MEMS mirror 11. The position detector 12A is configured on the same semiconductor substrate with the MEMS mirror 11. The position detector 12A which is a electrostatic electrode is applied with a voltage. For example, the position detector 12A has positive or negative potentials.

The position detector 13A is configured at the maximum position of the MEMS mirror 11. The position detector 13A is configured on the same semiconductor substrate with the MEMS mirror 11. The position detector 13A is a electrostatic electrode. The position detector 13A is applied with a voltage. For example, the position detector 13A has positive or negative potentials.

The position detector 16A is configured on the MEMS mirror 11. The position detector 16A is equipped with a electrostatic electrode. The position detector 16A is applied with no voltage. The position detector 16A is close to the position detector 12A when the MEMS mirror 11 is at the initial position. Further, the position detector 16A is close to the position detector 13A when the MEMS mirror 11 is at the maximum position.

The position detector 16A is close to the position detector 12A when the MEMS mirror 11 is at the initial position. In the position detector 16A, negative charges are collected by applying positive charges to the position detector 12A. Then, a negative voltage is generated in position detector 16A. The negative voltage generated in the position detector 16A is output to the control unit 15 as a position signal.

The position detector 16A is close to the position detector 13A when the MEMS mirror 11 is at the maximum position. In the position detector 16A, negative charges are collected by applying positive charges to the position detector 13A. Then, a negative voltage is generated in the position detector 16A. The negative voltage generated in the position detector 16A is output to the control unit 15 as a position signal.

Figure 6:
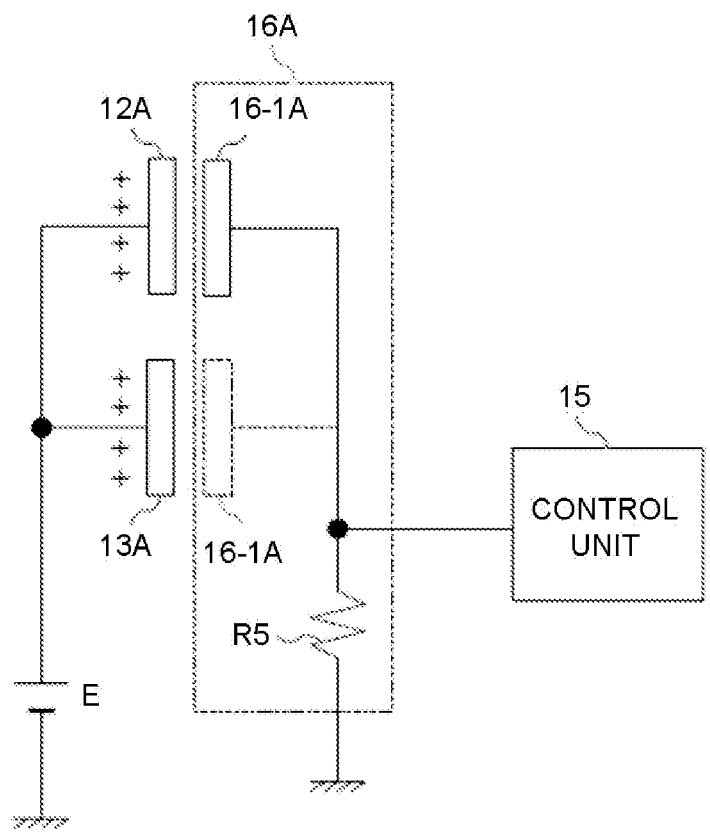
FIG. 6 is a diagram exemplifying the general structures of the position detectors 12A, 13A and 16A of an optical scanner 1A according to embodiment 2.

FIG. 6 is a diagram exemplifying the general structures of the position detectors 12A, 13A and 16A of the optical scanner 1A according to embodiment 2.

The position detector 16A is equipped with a electrostatic electrode 16-1A and a resistor R5.

As shown in FIG. 6, the position of the electrostatic electrode 16-1A indicated by solid lines represents the initial position of the MEMS mirror 11, and the position of the electrostatic electrode 16-1A indicated by dashed lines represents the maximum position of the MEMS mirror 11.

The electrostatic electrode 16-1A detects the voltage of the position detector 12A when the MEMS mirror 11 is at the initial position. That is, in the position detector 16A, the charges passing through the position detector 12A are attracted to the electrostatic electrode 16-1A. The attracted charges flow in the resistor R5, generating a voltage between the two terminals of the resistor R5. The generated voltage is output by the position detector 16A to the control unit 15 as a position signal.

The electrostatic electrode 16-1A detects the voltage of the position detector 13A when the MEMS mirror 11 is at the maximum position. That is, in the position detector 16A, the charges passing through the position detector 13A are attracted to the electrostatic electrode 16-1A. The attracted charges flow in the resistor R5, generating a voltage between the two terminals of the resistor R5. The generated voltage is output by the position detector 16A to the control unit 15 as a position signal.

In addition, the scan control action of the optical scanner 1A of embodiment 2 is the same as that of the optical scanner of embodiment 1 and not described here repeatedly.

Embodiment 3

Figure 7:
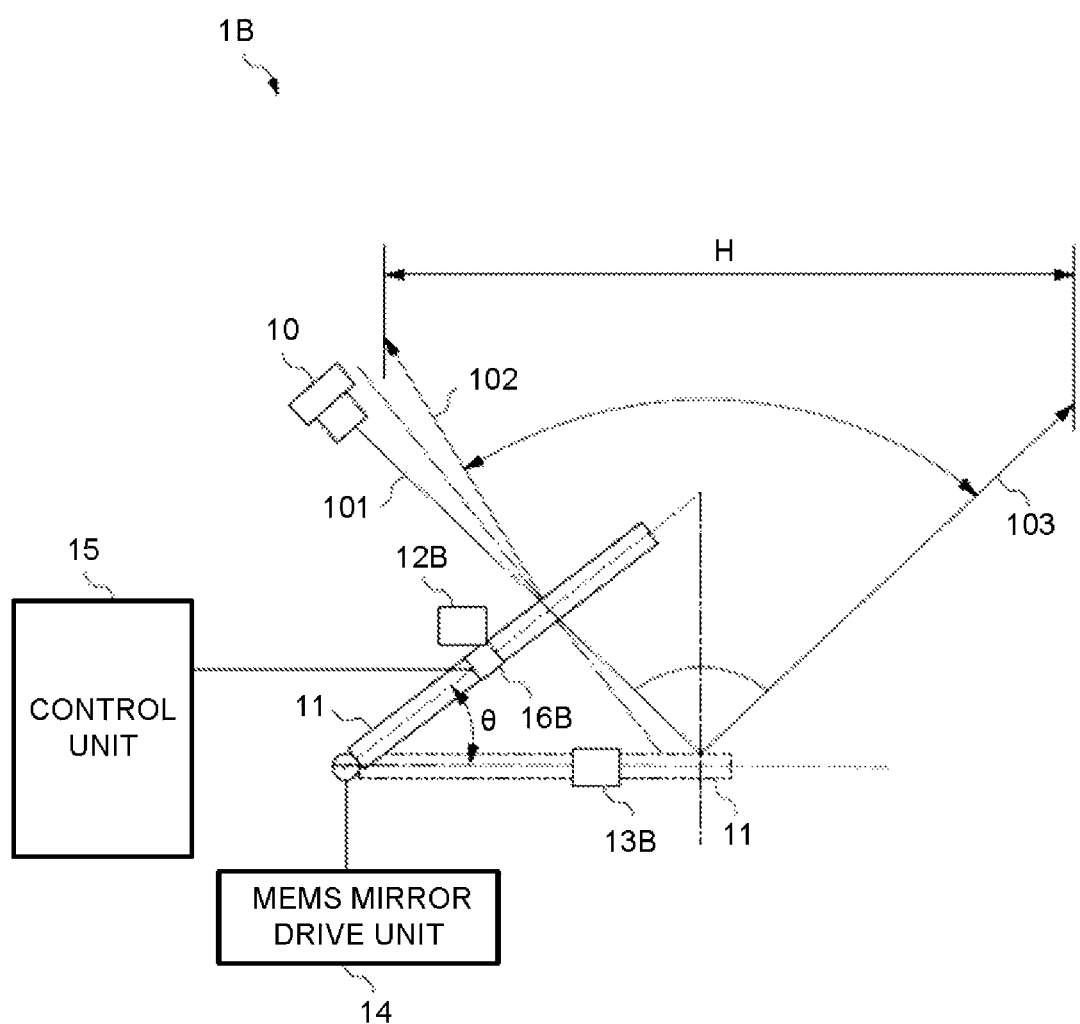
FIG. 7 is a diagram illustrating the appearance of an example of an optical scanner 1B according to embodiment 3.

FIG. 7 is a diagram illustrating the appearance of an example of an optical scanner 1B according to embodiment 3. For example, the optical scanner 1B is applied to an image forming apparatus. Moreover, the structural elements shown in FIG. 7 which are identical to those involved in embodiment 1 are denoted by the same reference signs and not described repeatedly here. The optical scanner 1B emits a light beam which is modulated according to an image signal read by the image forming apparatus. Moreover, the optical scanner 1B reflects the light beam with the MEMS mirror and irradiates (exposes) the surface of a photoconductive drum with the reflected light beam to form an electrostatic latent image. In this case, the optical scanner 1B detects the drive position of the MEMS mirror using a position detector configured on the same semiconductor substrate with the MEMS mirror.

The optical scanner 1B comprises a light source 10, an MEMS mirror 11, position detectors 12B and 13B, an MEMS mirror drive unit 14, a control unit 15 and a position detector 16B.

The position detector 12B is configured at the initial position of the MEMS mirror 11. The position detector 12B is configured on the same semiconductor substrate with the MEMS mirror 11. The position detector 12B is applied with a voltage. The position detector 12B generates magnetic flux. For example, the position detector 12B is an inductor.

The position detector 13B is configured at the maximum position of the MEMS mirror 11. The position detector 13B is configured on the same semiconductor substrate with the MEMS mirror 11. The position detector 13B is applied with a voltage. The position detector 13B generates magnetic flux. For example, the position detector 13B is an inductor.

The position detector 16B is configured on the MEMS mirror 11. The position detector 16B detects magnetic flux. For example, the position detector 16B is a Hall element. The position detector 16B is close to the position detector 12B when the MEMS mirror 11 is at the initial position. Further, the position detector 16B is close to the position detector 13B when the MEMS mirror 11 is at the maximum position.

The position detector 16B is close to the position detector 123 when the MEMS mirror 11 is at the initial position. The position detector 16B detects the magnetic flux generated by the position detector 123. If the magnetic flux is detected, then the position detector 16B outputs a position signal to the control unit 15.

The position detector 163 is close to the position detector 133 when the MEMS mirror 11 is at the maximum position. The position detector 163 detects the magnetic flux generated by the position detector 13B. If the magnetic flux is detected, then the position detector 163 outputs a position signal to the control unit 15.

Figure 8:
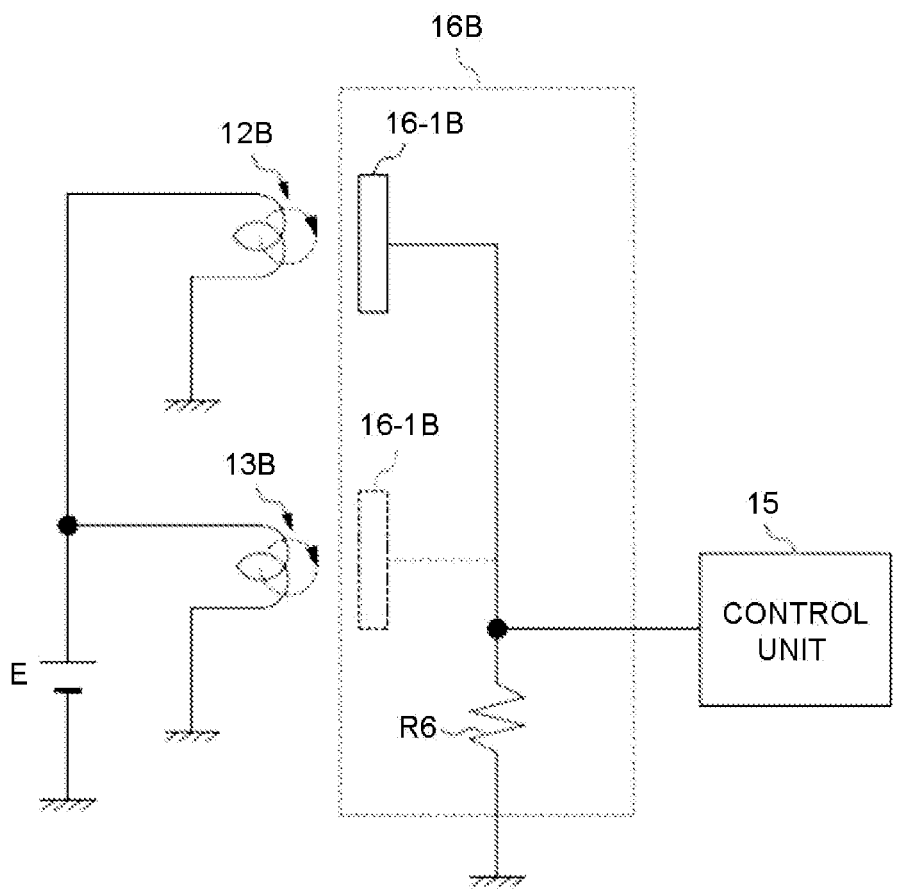
FIG. 8 is a diagram exemplifying the general structures of the position detectors 12B, 13B and 16B of an optical scanner 1B according to embodiment 3.

FIG. 8 is a diagram exemplifying the general structures of the position detectors 12B, 133 and 163 of the optical scanner 1B according to embodiment 3.

The position detector 16B is equipped with a Hall element 16-1B and a resistor R6.

As shown in FIG. 8, the position of the Hall element 16-1B indicated by solid lines represents the initial position of the MEMS mirror 11, and the position of the Hall element 16-1B indicated by dashed lines represents the maximum position of the MEMS mirror 11.

The Hall element 16-1B detects the magnetic flux of the position detector 12B when the MEMS mirror 11 is at the initial position. When detecting the magnetic flux, the position detector 16B generates a voltage between the two terminals of the resistor R6. The generated voltage is output by the position detector 16B to the control unit 15 as a position signal.

The Hall element 16-1B detects the magnetic flux of the position detector 13B when the HEMS mirror 11 is at the maximum position. When detecting the magnetic flux, the position detector 16B generates a voltage between the two terminals of the resistor R6. The generated voltage is output by the position detector 16B to the control unit 15 as a position signal.

Further, the scan control action of the optical scanner 1B of embodiment 3 is the same as that of the optical scanner of embodiment 1 and not described here repeatedly.

In accordance with at least one of the foregoing embodiments, an optical scanner comprises a light source, an MEMS mirror and a position detector. The light source emits a light beam. The MEMS mirror deflects the light beam emitted from the light source. The position detector detects the position of the MEMS mirror. The position detector is configured on the same semiconductor substrate with the MEMS mirror. In this way, the optical scanner of present invention avoids the deviation in the drive position of the MEMS mirror caused by the change in the optical scanner or the secular change of the MEMS mirror and the increase in size of the optical scanner.

Further, all or part of the functions of the foregoing control unit 15 are totally or partially used to record the programs (image forming programs) for realizing the functions in a computer-readable recording medium. Moreover, the functions may also be realized through the execution of the programs recorded in the recording medium by a CPU.

Further, the 'computer-readable recording medium' refers to a movable medium and a memory unit. For example, the movable medium is a floppy disk, a compact disk, an ROM or a CD-ROM. For example, the memory unit is a hard disc built in a computer system. Further, the 'computer-readable recording medium' refers to a network, a medium which dynamically stores a program for a short time or a medium which stores a program at a given moment. For example, the network is the Internet. For example, the medium for dynamically storing a program is a communication line which sends a program via a communication line. For example, the medium which stores a program at a given moment is a volatile memory constituting the inside of the computer system of a server or a client. Further, the foregoing programs may also be used to realize a part of the foregoing functions. Further, the foregoing functions may be realized by a combination of programs stored in a computer system.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanner, comprising:
   a light source configured to emit a light beam;
   a semiconductor substrate;
   a MEMS mirror on the semiconductor substrate, the MEMS mirror configured to deflect the light beam emitted from the light source; and
   a position detector on the semiconductor substrate, the position detector configured to detect a position of the MEMS mirror, wherein
   the position detector comprises a light-emitting component and a light-receiving component,
   the light-emitting component emits a light,
   the light-receiving component receives the light reflected by a wall surface of the MEMS mirror, and
   the position detector detects the position of the MEMS mirror based on the received light.

2. The optical scanner according to claim 1, wherein
   the position detector is configured at an initial position and a maximum position of the MEMS mirror;
   the initial position of the MEMS mirror is a position of the MEMS mirror where the light beam irradiates a start position of a scan area; and
   the maximum position of the MEMS mirror is the position of the MEMS mirror where the light beam irradiates an end position of the scan area.

* * * * *